(12) United States Patent
Seok et al.

(10) Patent No.: US 9,100,937 B2
(45) Date of Patent: Aug. 4, 2015

(54) METHOD AND APPARATUS OF SCANNING CHANNELS IN WIRELESS LOCAL AREA NETWORK

(75) Inventors: Yong Ho Seok, Gyeongki-do (KR); Eun Sun Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/384,844

(22) PCT Filed: Oct. 21, 2009

(86) PCT No.: PCT/KR2009/006104
§ 371 (c)(1),
(2), (4) Date: Jan. 19, 2012

(87) PCT Pub. No.: WO2011/030957
PCT Pub. Date: Mar. 17, 2011

(65) Prior Publication Data
US 2012/0120904 A1    May 17, 2012

Related U.S. Application Data (60) Provisional application No. 61/240,664, filed on Sep. 9, 2009.

(51) Int. Cl.
*H04W 16/14* (2009.01)
*H04W 48/18* (2009.01)
*H04W 72/04* (2009.01)
(Continued)

(52) U.S. Cl.
CPC .............. *H04W 72/02* (2013.01); *H04W 48/16* (2013.01); *H04W 72/0453* (2013.01); *H04W 72/085* (2013.01); *H04L 5/0032* (2013.01); *H04L 5/0066* (2013.01); *H04W 16/14* (2013.01); *H04W 36/30* (2013.01); *H04W 84/12* (2013.01)

(58) Field of Classification Search
USPC .................................................. 370/328–338
IPC ............. H04W 8/00,16/00, 76/00, 84/00, 88/00
See application file for complete search history.

(56) References Cited

U.S. PATENT DOCUMENTS

| 5,276,908 A | 1/1994 | Koohgoli et al. |
| 5,774,805 A | 6/1998 | Zicker |

(Continued)

FOREIGN PATENT DOCUMENTS

| CN | 1221542 A | 6/1999 |
| CN | 1561647 | 1/2005 |

(Continued)

OTHER PUBLICATIONS

Office Action issued in technologically related U.S. Appl. No. 13/046,048 dated Dec. 6, 2012.

(Continued)

*Primary Examiner* — Andrew Chriss
*Assistant Examiner* — John Lequang
(74) *Attorney, Agent, or Firm* — Morgan, Lewis & Bockius LLP (57) ABSTRACT

A method and apparatus of scanning channels of a white space zone in a wireless local area network is provided. A beacon frame includes a white space map including information about whether each white space channel in the white space zone is occupied by an incumbent user. Channels of the white space zone are scanned based on the white space map.

4 Claims, 4 Drawing Sheets

(51) Int. Cl.
*H04W 72/02* (2009.01)
*H04W 48/16* (2009.01)
*H04W 72/08* (2009.01)
*H04W 84/12* (2009.01)
*H04L 5/00* (2006.01)
*H04W 36/30* (2009.01)

(56) References Cited

U.S. PATENT DOCUMENTS

| | | |
|---|---|---|
| 6,175,739 B1 | 1/2001 | Ishii et al. |
| 6,757,550 B1 | 6/2004 | Yoneyama et al. |
| 6,826,400 B1 | 11/2004 | Cashman et al. |
| 6,882,841 B1 | 4/2005 | Youn |
| 7,280,834 B2 | 10/2007 | Takarabe |
| 7,606,193 B2 | 10/2009 | McFarland et al. |
| 7,742,764 B2 | 6/2010 | Gillig et al. |
| 7,917,110 B2 | 3/2011 | Horiguchi et al. |
| 8,032,086 B2 | 10/2011 | Waltho et al. |
| 8,483,155 B1* | 7/2013 | Banerjea et al. ............ 370/329 |
| 8,583,129 B2 | 11/2013 | Kim et al. |
| 8,588,158 B2 | 11/2013 | Kim et al. |
| 8,588,160 B2 | 11/2013 | Kim et al. |
| 8,605,741 B2 | 12/2013 | Kim et al. |
| 8,792,466 B2 | 7/2014 | Kim et al. |
| 2002/0027919 A1 | 3/2002 | Eneroth et al. |
| 2002/0154653 A1 | 10/2002 | Benveniste |
| 2003/0050012 A1 | 3/2003 | Black et al. |
| 2003/0093526 A1 | 5/2003 | Nandagopalan et al. |
| 2005/0003827 A1 | 1/2005 | Whelan |
| 2005/0043047 A1 | 2/2005 | Vigier et al. |
| 2005/0063334 A1 | 3/2005 | Fnu et al. |
| 2005/0070279 A1 | 3/2005 | Ginzburg et al. |
| 2005/0169292 A1 | 8/2005 | Young |
| 2006/0034236 A1 | 2/2006 | Jeong et al. |
| 2006/0062183 A1 | 3/2006 | Forte et al. |
| 2006/0067354 A1 | 3/2006 | Waltho et al. |
| 2006/0089964 A1 | 4/2006 | Pandey et al. |
| 2006/0218392 A1 | 9/2006 | Johnston |
| 2007/0014267 A1 | 1/2007 | Lam et al. |
| 2007/0047492 A1 | 3/2007 | Kim et al. |
| 2007/0192472 A1 | 8/2007 | Tokunaga et al. |
| 2007/0253394 A1 | 11/2007 | Horiguchi et al. |
| 2008/0025282 A1 | 1/2008 | Hong |
| 2008/0130519 A1* | 6/2008 | Bahl et al. ............ 370/254 |
| 2008/0151796 A1 | 6/2008 | Jokela |
| 2008/0165754 A1 | 7/2008 | Hu |
| 2008/0171552 A1 | 7/2008 | Hyon et al. |
| 2008/0240024 A1* | 10/2008 | Rao et al. ............ 370/329 |
| 2008/0268832 A1 | 10/2008 | Peng |
| 2008/0298333 A1* | 12/2008 | Seok ............ 370/338 |
| 2009/0061783 A1 | 3/2009 | Choi et al. |
| 2009/0111463 A1 | 4/2009 | Simms et al. |
| 2009/0158282 A1 | 6/2009 | Blaisdell et al. |
| 2009/0171930 A1 | 7/2009 | Vaughan et al. |
| 2009/0191906 A1 | 7/2009 | Abedi |
| 2009/0196180 A1* | 8/2009 | Bahl et al. ............ 370/235 |
| 2009/0197627 A1 | 8/2009 | Kuffner et al. |
| 2009/0207800 A1 | 8/2009 | Shan et al. |
| 2009/0217333 A1* | 8/2009 | Young et al. ............ 725/109 |
| 2009/0268674 A1 | 10/2009 | Liu et al. |
| 2009/0280748 A1 | 11/2009 | Shan et al. |
| 2009/0298522 A1* | 12/2009 | Chaudhri et al. ............ 455/509 |
| 2009/0323835 A1* | 12/2009 | Rao et al. ............ 375/260 |
| 2009/0325499 A1 | 12/2009 | Corke et al. |
| 2010/0008285 A1 | 1/2010 | Kuroda |
| 2010/0030907 A1 | 2/2010 | Pollak |
| 2010/0034160 A1 | 2/2010 | Prakash et al. |
| 2010/0048234 A1 | 2/2010 | Singh |
| 2010/0061299 A1 | 3/2010 | Kennedy et al. |
| 2010/0069013 A1 | 3/2010 | Chaudhri et al. |
| 2010/0081449 A1 | 4/2010 | Chaudhri et al. |
| 2010/0091712 A1 | 4/2010 | Lu et al. |
| 2010/0111235 A1 | 5/2010 | Zeng et al. |
| 2010/0124254 A1* | 5/2010 | Wu et al. ............ 375/131 |
| 2010/0142458 A1 | 6/2010 | Mark |
| 2010/0175101 A1 | 7/2010 | Devictor et al. |
| 2010/0177756 A1 | 7/2010 | Choi et al. |
| 2010/0195580 A1 | 8/2010 | Samarasooriya et al. |
| 2010/0195590 A1 | 8/2010 | Park |
| 2010/0195595 A1 | 8/2010 | Iwata |
| 2010/0195667 A1 | 8/2010 | Wang et al. |
| 2010/0220687 A1 | 9/2010 | Reznik et al. |
| 2010/0229205 A1 | 9/2010 | Hakusui |
| 2010/0232372 A1 | 9/2010 | Jakllari et al. |
| 2010/0246434 A1* | 9/2010 | Wang et al. ............ 370/253 |
| 2010/0246506 A1 | 9/2010 | Krishnaswamy |
| 2010/0303026 A1 | 12/2010 | Chaudhri et al. |
| 2010/0309317 A1 | 12/2010 | Wu et al. |
| 2010/0309806 A1 | 12/2010 | Wu et al. |
| 2011/0019649 A1 | 1/2011 | Dayal et al. |
| 2011/0043710 A1 | 2/2011 | Samarasooriya et al. |
| 2011/0045781 A1 | 2/2011 | Shellhammer et al. |
| 2011/0090887 A1 | 4/2011 | Kim et al. |
| 2011/0090890 A1 | 4/2011 | Seok et al. |
| 2011/0091393 A1 | 4/2011 | Simmonds et al. |
| 2011/0116458 A1 | 5/2011 | Hsu et al. |
| 2011/0122855 A1 | 5/2011 | Henry |
| 2011/0164581 A1 | 7/2011 | Keon |
| 2011/0222488 A1 | 9/2011 | Kim et al. |
| 2011/0243078 A1 | 10/2011 | Kim et al. |
| 2011/0280228 A1 | 11/2011 | McCann et al. |
| 2011/0286405 A1 | 11/2011 | Kim et al. |
| 2011/0287802 A1 | 11/2011 | Ma et al. |
| 2012/0026941 A1 | 2/2012 | Ahmad et al. |
| 2012/0063364 A1* | 3/2012 | Emmelmann et al. ............ 370/255 |
| 2012/0096492 A1 | 4/2012 | Urban et al. |
| 2012/0096498 A1 | 4/2012 | Wu et al. |
| 2012/0120904 A1 | 5/2012 | Seok et al. |
| 2012/0165056 A1 | 6/2012 | Kim et al. |
| 2012/0170534 A1 | 7/2012 | Kim et al. |
| 2012/0208558 A1 | 8/2012 | Bajko et al. |
| 2012/0218956 A1 | 8/2012 | Kim et al. |
| 2012/0315855 A1 | 12/2012 | Li et al. |
| 2013/0103684 A1 | 4/2013 | Yee et al. |
| 2013/0114586 A1 | 5/2013 | Kim et al. |
| 2013/0142132 A1 | 6/2013 | Kim et al. |
| 2014/0113649 A1 | 4/2014 | Bajko et al. |

FOREIGN PATENT DOCUMENTS

| | | |
|---|---|---|
| CN | 1745528 A | 3/2006 |
| CN | 101006683 A | 7/2007 |
| CN | 101242333 A | 8/2008 |
| JP | 2000-504163 A | 4/2000 |
| JP | 2004-286460 A | 10/2004 |
| JP | 2007-043391 A | 2/2007 |
| JP | 2007-184850 A | 7/2007 |
| JP | 2007-300419 A | 11/2007 |
| JP | 2008-278456 A | 11/2008 |
| JP | 2009-200582 A | 9/2009 |
| JP | 2013-520938 A | 6/2013 |
| JP | 2013-530608 A | 7/2013 |
| JP | 2013-535853 A | 9/2013 |
| KR | 10-2009-0021865 A | 3/2009 |
| WO | 2006/117587 A1 | 11/2006 |
| WO | 2009-016800 A1 | 2/2009 |
| WO | 2009/031825 A2 | 3/2009 |
| WO | 2009/061779 A1 | 5/2009 |
| WO | 2009/069068 A2 | 6/2009 |
| WO | 2009/136760 A1 | 11/2009 |

OTHER PUBLICATIONS

Office Action issued in technologically related U.S. Appl. No. 12/910,186 dated Dec. 6, 2012.

Notice of Allowance issued in technologically related U.S. Appl. No. 13/096,289 dated Dec. 10, 2012.

Challapali, K. et al. "Spectrum agile radio: detecting spectrum opportunities." Proceeding of the International Symposium on Advanced Radio Technology (ISART). Mar. 2, 2004 pp. 61-65.

Cordeiro, C. et al. "IEE 802.22: An introduction to the first wireless standard based on cognitive radios." IEEE Journal of Communications. vol. 1, No. 1, Apr. 2006 pp. 38-47.

(56) References Cited

OTHER PUBLICATIONS

Han, J. et al. "Introduction of Cognitive Radio Network," KIISE Information Review. vol. 22 No. 2, Nov. 2008 pp. 1-16.
Mangold, S. et al. "Spectrum agile radio: radio resource measurements for opportunities spectrum usage." IEEE Global Telecommunications Conference (Globalcom 2002). vol. 6 2004 pp. 3467-3471.
International Search Report mailed Sep. 10, 2012 for related technology PCT/KR2009/006103.
International Search Report mailed Sep. 30, 2010 for PCT/KR2009/006104.
Office Action dated Feb. 12, 2013 in technology related U.S. Appl. No. 13/030,654.
Srivastava et al. "Expanding Wireless Communication with 'White Space,'" White Paper of Dell Inc., Oct. 2008.
Stevenson et al. "IEEE 802.22: The First Cognitive Radio Wireless Regional Area Network Standard," IEEE Communications Magazine, Jan. 2009, pp. 130-138.
Sturza et al. "White Spaces Engineering Study: can cognitive radio technology operating in the TV white spaces completely protect licensed TN broadcasting?" New America Foundation Wireless Future Program, working paper No. 16, Jan. 2007.
Bahl et al. "White Space Networking with Wi-Fi like Connectivity," ACM SIGCOMM 2009, Aug. 17, 2009.
Pagadarai et al. "Wireless Spectrum Characterisation and Dynamic Utilization in Vehicular Communication Networks," Final Report, Wireless Innovation Laboratory, Worcester Polytechnic Institute, Sep. 30, 2009.
Wei et al. "Two-Hop-Relay Architecture for Next-Generation WWAN/WLAN Integration," IEEE Wireless Communications, Apr. 2004, pp. 2-9.
Singh et al. "PAMAS-Power Aware Multi-Access Protocol with Signalling for Ad Hoc Networks," Computer Communication Review, vol. 28, Issue 3, Jul. 1998, pp. 5-26.
Juha Ala Laurila et al. "Wireless LAN Access Network Architecture for Mobile Operators," Computer Communication Review, IEEE Communications Magazine, Nov. 2001, pp. 82-89.
US Office Action in U.S. Appl. No. 12/993,409 dated Jan. 4, 2012.
PCT International Search Report in Application No. PCT/KR2010/007076 dated Jun. 24, 2011.
PCT International Search Report in Application No. PCT/KR2011/001885 dated Oct. 26, 2011.
PCT International Search Report in Application No. PCT/KR2011/002276 dated Dec. 28, 2011.
PCT International Search Report in Application No. PCT/KR2010/06955 dated Jun. 24, 2011.
PCT International Search Report in Application No. PCT/KR2010/008976 dated Aug. 22, 2011.
PCT International Search Report in Application No. PCT/KR2010/006954 dated Jun. 24, 2011.
PCT International Search Report in Application No. PCT/KR2010/007011 dated Jun. 21, 2011.
Nan Hao, et al., Short-Range WLAN Compatible Hybrid Cognitive Radio Networks System and MAC Protocol, Communication Software and Networks, 2009, ICCSN 2009 International Conference on Communication Software and Networks, IEEE, Feb. 28, 2009, pp. 81-86.
Office Action issued in related technology U.S. Appl. No. 12/993,409 mailed Jul. 3, 2012.
USPTO Notice of Allowability dated Jul. 12, 2013 in related technology U.S. Appl. No. 12/910,186.
USPTO Notice of Allowability dated Jul. 17, 2013 in related technology U.S. Appl. No. 13/051,562.
USPTO Office Action dated Sep. 5, 2013 in related technology U.S. Appl. No. 12/908,449.
Office Action dated Apr. 1, 2014, issued by the State Intellectual Property Office of China in Chinese Patent Application No. 201080058187.0.
Notice of Allowance dated Apr. 25, 2014, issued by the U.S. Patent & Trademark Office in U.S. Appl. No. 12/993,409.
Office Action dated May 23, 2014, issued by the U.S. Patent & Trademark Office in U.S. Appl. No. 14/074,276.
USPTO Office Action dated Mar. 7, 2014 in related technology U.S. Appl. No. 12/908,449.
Nekovee, M., A Survey of Cognitive Radio Access to TV White Spaces, Ultra Modem Telecommunications & Workshops, 2009, ICUMT'09, International Conference on, Oct. 12, 2009, pp. 1-8.
Office Action dated Feb. 3, 2014 from the Canadian Intellectual Property Office in Canadian application 2,773,660.
First Notification of Office Action dated Dec. 23, 2013 from The State Intellectual Property Office of China in counterpart Chinese application 200980161376.8.
US Office Action dated Jan. 16, 2014 in related technology U.S. Appl. No. 14/074,276.
Ha Nguyen Tran, et al., Requirements and Amendment Regarding TVWS Database Access, IEEE 802.11-10/0262r1, IEEE mentor, Mar. 17, 2010, pp. 2-12.
Necati Canpolat, et al., TGu Single GAS Protocol, IEEE 802.11-10/0266r9, IEEE mentor, Mar. 18, 2010, pp. 2-57.
Eunsun Kim, et al., Normative Text for Scanning in TV Whitespaces, IEEE 802.11-10/0472r2, IEEE mentor, May 11, 2010, pp. 2-13.
US Office Action dated Jan. 6, 2014 in related technology U.S. Appl. No. 12/933,409.
Office Action dated Jun. 25, 2014, issued by the U.S. Patent and Trademark Office in U.S. Appl. No. 12/908,449.
Chen Sun et al., Enabling Procedure of Communication in TVWS under FCC rules, IEEE 802.11-10/261r0, Feb. 2010.
Notice of Allowance dated Oct. 29, 2014, issued by the U.S. Patent and Trademark Office in U.S. Appl. No. 12/908,449.
Shkumbin Hamiti, Nokia, SDD editor, IEEE 802.16m System Description Document [Draft], IEEE 802.16m-08/003r8, IEEE, Apr. 10, 2009.
Office Action dated Jun. 27, 2014, issued by the State Intellectual Property Office of China in Chinese Patent Application No. 201080065876.4.
Office Action dated Jul. 3, 2014, issued by the State Intellectual Property Office of China in Chinese Patent Application No. 201080065374.1.
Office Action dated Nov. 26, 2014, issued by the State Intellectual Property Office in Chinese Patent Application No. 201180038039.7.
Office Action dated Dec. 18, 2014, issued by the U.S. Patent and Trademark Office in U.S. Appl. No. 14/288,559.
Office Action dated Dec. 19, 2014, issued by the U.S. Patent and Trademark Office in U.S. Appl. No. 14/052,603.

\* cited by examiner

METHOD AND APPARATUS OF SCANNING CHANNELS IN WIRELESS LOCAL AREA NETWORK

This is a U.S. National Phase Entry of PCT Application No. PCT/KR2009/006104, filed Oct. 21, 2009, and claims the benefit of U.S. Provisional Application No. 61/240,664 filed Sep. 9, 2009.

TECHNICAL FIELD

The present invention relates to a wireless local area network (WLAN), and more particularly, to a method and apparatus of channel scanning, when a WLAN system is applied in an environment where it can coexist with another wireless communication system.

BACKGROUND ART

There are frequency bands in which different kinds of wireless communication systems can coexist. One example of the frequency bands is a TV white space. The TV white space is an idle frequency band reserved due to digitalization of an analog broadcasting. The TV white space is a spectrum of 512 to 698 MHz allocated to a broadcast TV. When a licensed device is not used in the corresponding spectrum, an unlicensed device can use the corresponding band.

When IEEE 802.11 is used in the TV white space, there is an advantage in that the coverage is remarkably expanded due to the spectrum's characteristic. However, generally, as the coverage is expanded, the number of stations considerably increases. In this situation, a problem may arise in a capability of flexibly handling users with increase of the number of the users, i.e. scalability. Moreover, since several wireless communication systems coexist and several unlicensed devices coexist, a problem may arise in coexistence. If a Distributed Coordination Function (DCF) and an Enhanced Distributed Channel Access (EDCA) protocol of IEEE 802.11 are applied in this environment, scalability may be more deteriorated.

The DCF is a channel access mechanism used in IEEE 802.11 and is based on Carrier Sense Multiple Access/Collision Avoidance (CSMA/CA). Also, the EDCA is equivalent to a competition-based medium access method among channel access models suggested by a Hybrid Coordination Function (HCF) defined by expanding a general medium access control protocol of IEEE 802.11. Here, the HCF is a protocol defined in IEEE 802.11e suggested to ensure Quality of Service (QoS).

Further, when the protocol of IEEE 802.11 is applied in the TV white space, it is expected that overlapping Basic Service Sets (BSSs) will increase sharply. For example, if a user arbitrarily installs an Access Point (AP) supporting the TV white space, since the coverage of the AP is wide, an overlapping service area may increase.

When the unlicensed device intends to use the TV white space, it should acquire an available channel in a corresponding area, using a geo-location database. In addition, a signaling protocol or a spectrum sensing mechanism is necessary to solve a problem in coexistence of the unlicensed devices using the TV white space.

DISCLOSURE OF INVENTION

Technical Problem

The present invention provides a channel scanning mechanism capable of guaranteeing coexistence of unlicensed devices using a white space.

The present invention also provides a channel scanning mechanism capable of reducing overhead with respect to spectrum sensing generated during a scanning process when a large number of channels are scanned.

The present invention also provides a method for exchanging channel information between an access point (AP) and a station (STA) to thus reduce power consumption of the station yet without degrading detection probability with respect to an incumbent user.

Solution to Problem

In an aspect, a method of scanning channels of a white space zone in a wireless local area network is provided. The method is performed by an access point. The method includes acquiring a white space map by detecting at least one white space channel in the white space zone, the white space map including information about whether each white space channel in the white space zone is occupied by an incumbent user, and transmitting a beacon frame to a station, the beacon frame including the white space map to be scanned by the station.

The white space map may include a sensing channel number and a sensing report, the sensing report indicating a sensing result for a white space channel corresponding to the sensing channel number.

The sensing report may include a primary user bit indicating whether or not there is an incumbent user in the a white space channel corresponding to the sensing channel number.

The sensing report may further include a unknown user bit indicating whether or not there is an unknown user in the a white space channel corresponding to the sensing channel number.

The white space map may further include a sensing time including information about a time period during which sensing has been performed The white space map may be included in a frame body of the beacon frame.

In another aspect, a method of scanning channels of a white space zone in a wireless local area network is provided. The method is performed by a scanning station. The method includes receiving a beacon frame from a response station, the beacon frame including a white space map including information about whether each white space channel in the white space zone is occupied by an incumbent user, and scanning channels of the whitespace zone based on the white space map.

The white space map may include a sensing channel number and a sensing report, the sensing report indicating a sensing result for a white space channel corresponding to the sensing channel number.

The sensing report may include a primary user bit indicating whether or not there is an incumbent user in the a white space channel corresponding to the sensing channel number.

The sensing report may further include a unknown user bit indicating whether or not there is an unknown user in the a white space channel corresponding to the sensing channel number.

The white space map may further include a sensing time including information about a time period during which sensing has been performed.

The step of scanning channels of the whitespace zone includes determining a un-occupied channel based on the white space map, and scanning the unoccupied channel.

In another aspect, a wireless apparatus is provided. The wireless apparatus includes a transceiver configured to receive a beacon frame, the beacon frame including a white space map including information about whether each white space channel in the white space zone is occupied by an incumbent user, and a processor configured to scan channels of the whitespace zone based on the white space map.

Advantageous Effects of Invention

In a white space zone, a scanning station can scan only unoccupied channels. Channel scanning may be performed faster and power consumption due to channel scanning may be reduced.

MODE FOR THE INVENTION

A management procedure in a wireless communication system and a device supporting the management procedure according to exemplary embodiments of the present invention will now be described with reference to the accompanying drawings. In the following description of the exemplary embodiments of the present invention, a wireless local area network (WLAN) system operating in a white space, among wireless communication systems, will be taken as an example, but it is merely illustrative and the technical idea of the present invention is not meant to be limited thereto. Thus, the exemplary embodiments of the present invention described hereinafter can be also applied in the same manner to any other wireless communication systems that performs a process of scanning a plurality of channels than the WLAN system, except for the case not allowed in its properties. In this case, terms or words unique to the WLAN employed in the exemplary embodiments of the present invention may be properly altered to other terms or words commonly used in a corresponding wireless communication system.

Figure 1:
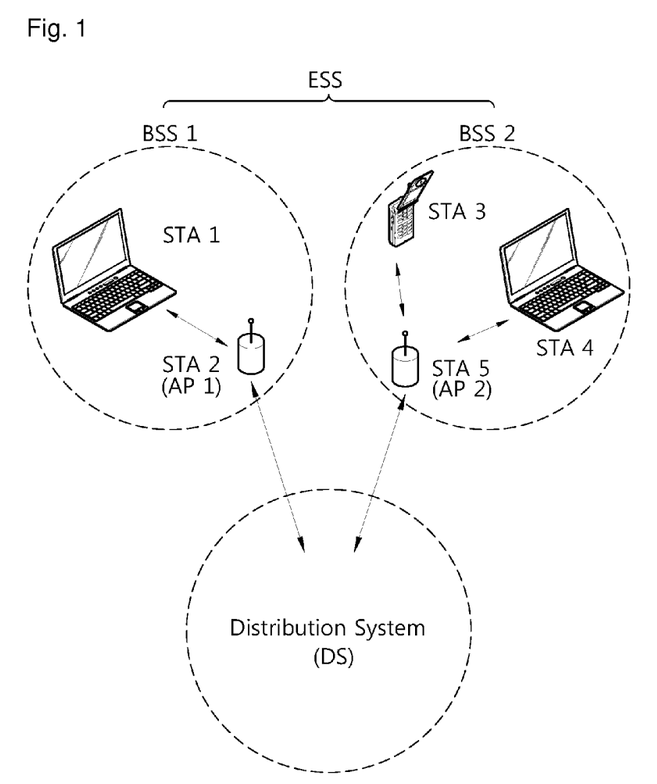
FIG. 1 illustrates the configuration of a wireless local area network (WLAN) according to an exemplary embodiment of the present invention.

FIG. 1 is a schematic view showing an exemplary structure of a WLAN system according to an embodiment of the present invention.

Referring to FIG. 1, a WLAN system such as the WLAN system includes one or more basis service sets (BSSs). The BSS is a set of stations (STAs) which are successfully synchronized to communicate with one another, and is not a concept indicating a specific region. The BSS can be classified into an infrastructure BSS and an independent BSS (IBSS). The infrastructure BSS is shown in FIG. 1. Infrastructure BSSs (i.e., BSS1 and BSS2) include one or more non-access point (AP) STAs (i.e., Non-AP STA1, Non-AP STA3, and Non-AP STA4), AP STAs (i.e., AP STA1 and AP STA2) which are STAs providing a distribution service, and a distribution system (DS) connecting the plurality of AP STAs (i.e., AP STA1 and AP STA2). In the infrastructure BSS, an AP STA manages non-AP STAs of the BSS.

On the other hand, the IBSS is a BSS operating in an ad-hoc mode. Since the IBSS does not include the AP, a centralized management entity for performing a management function in a centralized manner does not exist. That is, the IBSS manages the non-AP STAs in a distributed manner. In addition, in the IBSS, all STAs may consist of mobile STAs, and a self-contained network is configured since access to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, and STA5) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. In the following description, a non-AP STA operating in a TV white space spectrum would be referred to as 'non-AP WS STA' or simply as 'WS STA'.

The AP (i.e., AP1 and AP2) is a functional entity for providing access to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. In the following description, a AP STA operating in a TV white space spectrum would be referred to as 'WS AP'.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

To access a network, an STA first performs a procedure of searching a network the STA can join. Before joining the wireless network, the STA must identify a compatible network, and the process of identifying a network present in a particular area is called scanning.

Table 1 below shows types of parameters that can be used for the scanning procedure and brief descriptions therefor.

TABLE 1

| Name | Type | Valid range | Description |
|---|---|---|---|
| BSSType | Enumeration | INFRASTRUCTURE, INDEPENDENT, ANY_BSS | Determines whether infrastructure BSS, IBSS, or both, are included in the scan. |
| BSSID | MACAddress | Any valid individual or broadcast MAC address | Identifies a specific or wildcard BSSID. |
| SSID | Octet string | 0-32 octets | Specifies the desired SSID or the wildcard SSID. |
| ScanType | Enumeration | ACTIVE, PASSIVE | Indicates either active or passive scanning. |
| ProbeDelay | Integer | N/A | Delay (in microseconds) to be used prior to transmitting a Probe frame during active scanning. |
| ChannelList | Ordered set of integers | Each channel will be selected from the valid channel range for the appropriate PHY and carrier set. | Specifies a list of channels that are examined when scanning for a BSS. |
| MinChannelTime | Integer | ≥ProbeDelay | The minimum time (in TU) to spend on each channel when scanning. |
| MaxChannelTime | Integer | ≥MinChannelTime | The maximum time (in TU) to spend on each channel when scanning. |
| VendorSpecificInfo | A set of information elements | | Zero or more information elements. |

The STA scans a network that can be accessible according to the parameter values of Table 1, and in this case, the STA performs scanning in an active scanning scheme or a passive scanning scheme according to a ScanType parameter value in Table 1.

Figure 2:
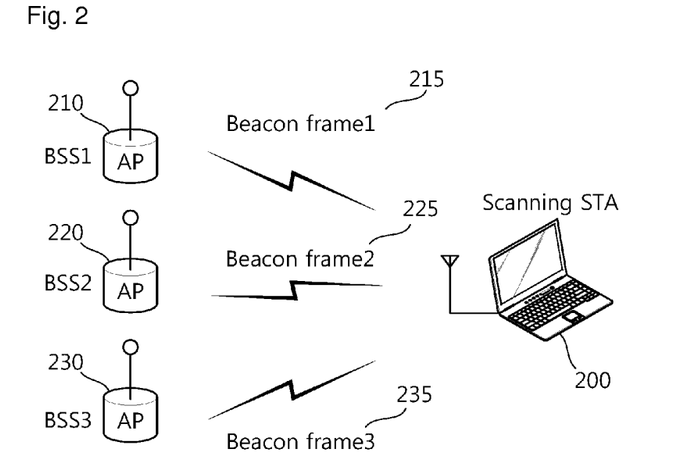
FIG. 2 is a view schematically showing a passive scanning scheme.

FIG. 2 schematically shows the passive scanning scheme. In the passive scanning scheme, a scanning STA waits for a beacon frame while monitoring each channel on a channel list. The channel list specifies a list of channels that are examined when scanning for a BSS. The beacon frame, one of management frames in IEEE 802.11, is periodically transmitted to inform about the presence of a wireless network, allow the scanning STA to search for the wireless network to join it. In an infrastructure network, an access point (AP) transmits the beacon frame, and in the IBSS, STAs within the IBSS transmit the beacon frame by turns.

When the scanning STA receives the beacon frame, it buffers the beacon frame to acquire information about a BSS, and records the beacon frame information in each channel while moving to the channels.

With reference to FIG. 2, a scanning STA 200 performs channel scanning in a particular channel according to the passive scanning scheme. If the scanning STA 200 receives a beacon frame 215 transmitted by an AP1 210 of a BSS1 and a beacon frame 225 transmitted by an AP2 220 of a BSS2, but not a beacon frame 235 transmitted by an AP3 230 of a BSS3, the scanning STA 200 performs buffering that the two BSSs (BSS1 and BSS2) have been discovered from a current channel and moves to another channel. Repeatedly performing this process, the scanning STA 200 performs scanning on every channel on a channel list.

In this respect, however, immediately application of the passive scanning scheme as described above to the WS STA operating in the TV white space environment is not proper. This is because a WS AP and the WS STA operating in the TV white space should provide a protection function with respect to a licensed device, and in this case, the licensed device has priority over the use of a corresponding band. The licensed device is a user allowed to use the corresponding band, which may be called by other names such as licensed user, primary user, incumbent user, and the like. In the following description, the incumbent user will be used as the licensed device.

When the incumbent user such as a microphone is already using the corresponding channel, the use of the corresponding channel should be stopped in order to protect the incumbent user.

According to the passive scanning method, the scanning STA should stay during more than a minimum beacon frame period in the corresponding channel of every channel of the TV white space, to wait for transmission of a beacon frame. If a bandwidth of a single channel in the TV white space is 6 MHz, 30 or more channels may exist. If a certain scanning STA scans every channel, overhead would be severe. Thus, it would be desirous for the scanning STA to omit scanning on a channel in which the incumbent user exists or an occupied channel among the scanning target channels. To this end, it is required to provide in advance information regarding whether or not an incumbent user exists in each channel to the scanning STA.

Figure 3:
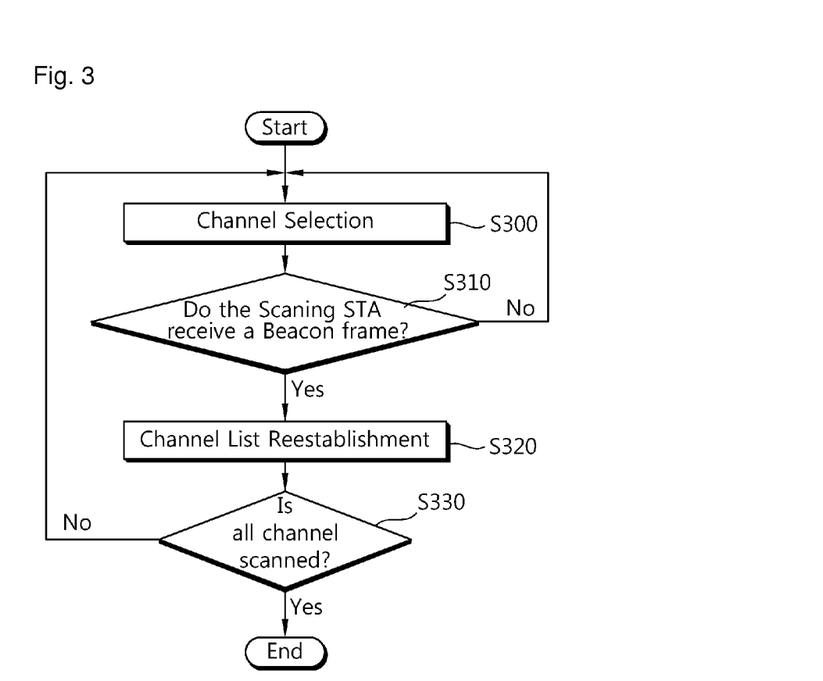
FIG. 3 is a flow chart illustrating the process of a channel scanning procedure according to an exemplary embodiment of the present invention.

FIG. 3 is a flow chart illustrating the process of a channel scanning procedure according to an exemplary embodiment of the present invention.

With reference to FIG. 3, the scanning STA selects one channel from a channel list (S300). The scanning STA waits for receiving a beacon frame at the selected channel. In this case, the scanning STA stays at the channel for more than a minimum beacon interval and determines whether or not a beacon frame is received (S310). If the scanning STA receives a beacon frame, it reestablishes the channel list (S320), and if the scanning STA does not receive a beacon frame, it regards that there is no accessible IEEE 802.11 network in the corresponding channel, selects a next channel again (S300) and moves to the next channel. When the scanning STA receives a beacon frame, it reconfigures the channel list, and in this case, the reconfiguration of the channel list is made based on channel information included in the beacon frame which has been received by the scanning STA. In the following description, an information element regarding white space (WS) channel information will be referred to as a white space map (WSM).

The WSM includes WS channel information the WS AP knows about. In the following description, unless otherwise specified, the channel refers to a WS channel. The WS AP may scan each channel or receive channel information from another WS AP or STA to keep the WSM and update the same. The WS AP performs channel sensing to check whether or not there is an incumbent user in each channel in order to construct a WSM periodically or non-periodically. In this case, an energy detection method, a signature detection method, or the like, may be used as the channel sensing mechanism of the WS AP. For example, if a signature of an incumbent user is detected in a corresponding frequency band according to the sensing result, it may be determined that there is an incumbent user in the corresponding frequency band.

The WSM includes information regarding whether or not there is an incumbent user in each channel, or the like. Accordingly, upon receiving the beacon frame, the scanning STA recognizes whether or not there is an incumbent user in each channel through the WSM included in the beacon frame.

Referring back to FIG. 3, the scanning STA reconfigures scanning target channels based on the WSM (S320). Namely, the scanning STA excludes a channel known to have an incumbent user from the scanning target. And then, the scanning STA determines whether there is a channel which has not been scanned yet based on the reconfigured channel list (S330). If there is no more channel which has not been scanned yet, the scanning STA terminates the channel scanning procedure, whereas if there is any channel which has not been scanned yet, the scanning STA returns to step S300 to repeatedly perform the process on every channel which has not been scanned yet and known not to have an incumbent user.

A format of the WSM will now be described in detail.

Figure 4:
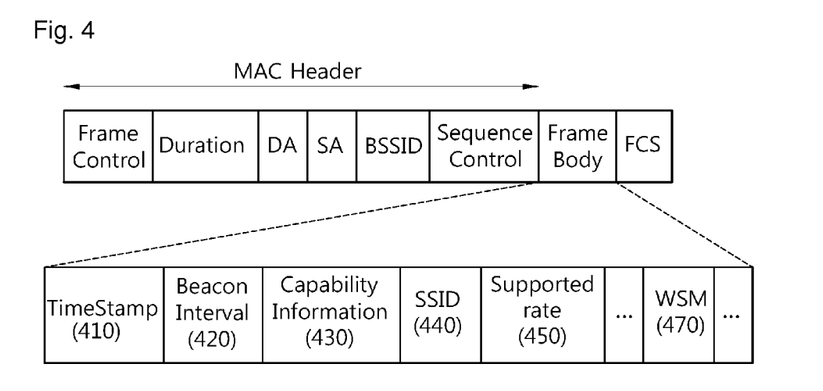
FIG. 4 illustrates a format of beacon frame according to an exemplary embodiment of the present invention.

FIG. 4 illustrates a format of beacon frame according to an exemplary embodiment of the present invention. A frame structure including a MAC header made up of Frame Control, Duration, DA, SA, BSSID, and Sequence Control field, Frame body, and FCS is a general form of a management frame of IEEE 802.11 standard. Details of the fields and subfields of the management frame are described in "IEEE Std 802.11-2007 (Mar. 8, 2007) (Revision of IEEE Std 802.11-1999), IEEE Standard for Information Technology-Telecommunications and information exchange between systems-Local and metropolitan area networks-Specific requirements, Part 11: Wireless LAN Medium Access Control (MAC) and Physical Layer (PHY) Specifications" which is incorporated by reference herein.

With reference to FIG. 4, a Frame Body of the beacon frame includes a Timestamp field 410, a Beacon interval field 420, a Capability Information field 430, a SSID field 440, a Supported rate field 450 and WSM 470.

The Timestamp field 410 represents the value of the timing synchronization function (TSF) timer of a frame's source. The length of the Timestamp field 410 is 8 octets.

The Beacon Interval field 420 represents the number of time units (TUs) between target beacon transmission times (TBTTs). The length of the Beacon Interval field 420 is 2 octets. 1 TU is 1,024 µs. For example, the beacon interval may be set to 100 TU, which means that the beacon frame is transmitted substantially at every 100 ms.

The Capability Information field 430 is used in Beacon transmissions to advertise the network's capabilities. Capability Information field 430 is also used in a Probe Request frame and a Probe Response frame. In this field, each bit is used as a flag to advertise a particular function of the network. Stations use the capability advertisement to determine whether they can support all the features in the BSS. Stations that do not implement all the features in the capability advertisement are not allowed to join.

The SSID field 440 is a service set ID and may be the name of a service set. The length of the SSID field 440 ranges from 0 to 4 octets. When the length of the SSID field 440 is 0 byte, the SSID field 440 is a broadcast SSID which is used for a STA to transmit a probe request frame to search for every nearby 802.11 network. In the beacon frame, the SSID field 440 may be an ID of a network to which the STA transmitting the beacon frame belongs.

The Supported rate field 450 is used to decide a data transfer rate supported by the IEEE 802.11 network. When attempting to join a network, the STA checks a data transfer rate used in the network from the Supported rate information element.

Following the Supported rate field, the beacon frame of IEEE 802.11 may further include information elements such as Frequency-Hopping (FH) parameter set, DS parameter set, Traffic Indication Map (TIM), etc.

The WSM 470 includes information regarding whether or not there is an incumbent user in each channel, or the like.

Figure 5:
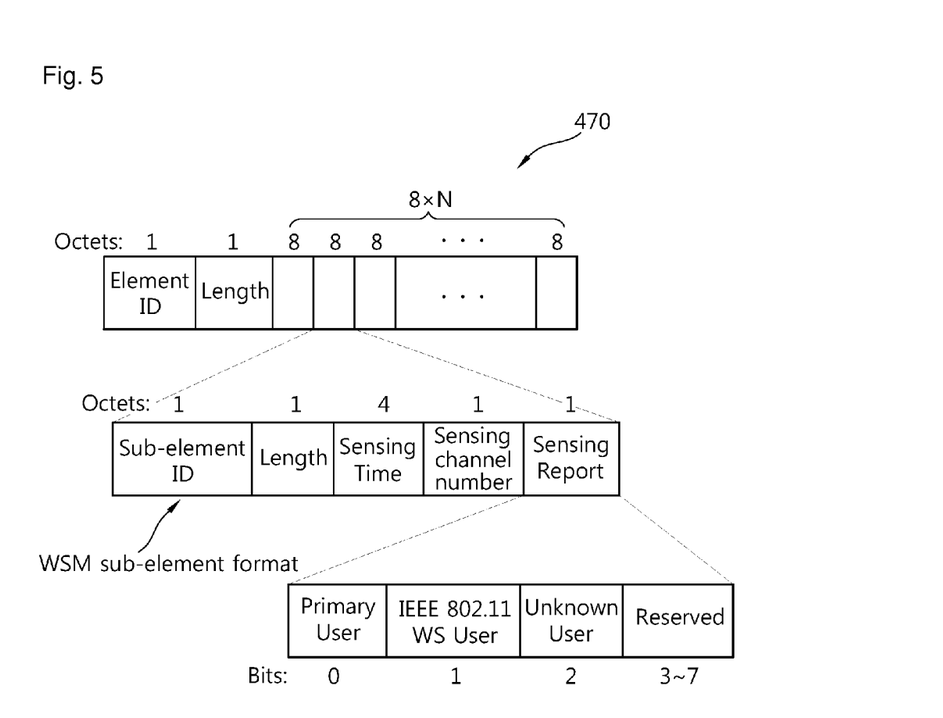
FIG. 5 illustrates an example of WSM.

FIG. 5 illustrates an example of WSM. The WSM 470 includes Element ID of identifying an element, Length informing about a length, and N number of WSM subelements. Here, N is the number of channels. Namely, each WSM sub-element includes information of a single channel.

A WSM sub-element may include Sub-element ID, Length, Sensing Time, Sensing Channel Number, and Sensing Report. The Sensing Time includes information about a time period during which sensing has been performed, which may be also indicated as a TSF time. The Sensing Channel Number indicates a channel number that has performed sensing. The Sensing Report indicates a sensing result with respect to a channel corresponding to the Sensing Channel Number.

The Sensing Report may have a length of 1 octet and include a Primary User bit, an IEEE 802.11 WS User bit, an Unknown User bit. The Primary User bit indicates whether or not there is an incumbent user in a corresponding channel. For example, if there is an incumbent user in a corresponding channel, the Primary User bit may be set to 1, whereas if there is no incumbent user in the corresponding channel, the Primary User bit may be set to 0. The IEEE 802.11 WS User bit indicates whether or not there is an IEEE 802.11 WS user. The Unknown User bit may be used to indicate an unknown user detected in the corresponding channel. The unknown user is a user whose type of radio access cannot be identified by an AP.

Figure 6:
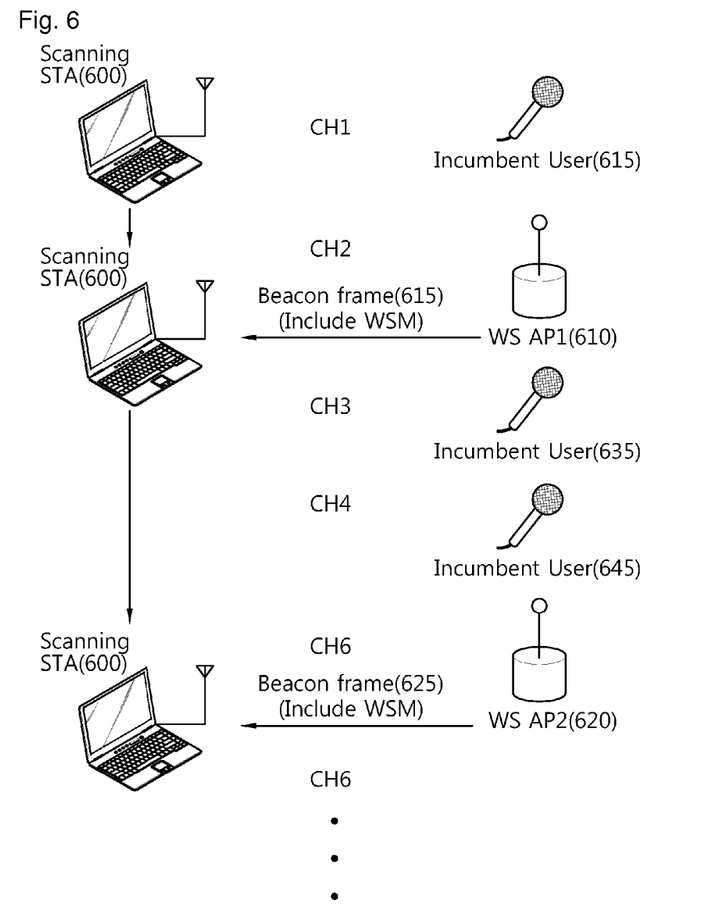
FIG. 6 illustrates a channel scanning method using a WSM according to an exemplary embodiment of the present invention.

FIG. 6 illustrates a channel scanning method using a WSM according to an exemplary embodiment of the present invention. It is assumed that incumbent users exist in a first channel CH1, a third channel CH3, and a fourth channel CH4, a WS AP1 610 exists in a second channel CH2, and a WS AP2 620 exists in a fifth channel CH5.

With reference to FIG. 6, a scanning STA 600 scans the channel in the first channel CH1. In this case, however, because there are incumbent users in the channels CH1 and CH3 so there is no 802.11 network, the scanning STA 600 moves to the second channel CH2.

Since there is no incumbent user in the second channel CH2 and the WS AP1 610 periodically transmits a beacon frame, the scanning STA 600 receives a beacon framel 615. In this case, the beacon framel 615 includes a WSM 470 carrying channel information (i.e., the information regarding the presence of incumbent users in the channels CH3 and CH4) the WS AP1 610 knows. According to the format of an exemplary embodiment of the present invention, in this case, the Primary User bit of the Sensing Report with respect to the channels CH3 and CH4 is set to 1, which is then transmitted.

Upon receiving a first beacon frame 615, the scanning STA 600 knows about the presence of the incumbent users in the channels CH3 and CH4 from a WSM included in the first beacon frame 615, the scanning STA 600 immediately moves to the fifth channel CH5, without performing scanning on the channels CH3 and CH4, and waits for a beacon frame. The scanning STA 600 receives a second beacon frame 625 including a WSM with respect to every channel the WS AP2 620 knows about from the WS AP2 620, updates the channel list again, and then performs scanning on the entirety of the following channels in the same manner as that of the process described above. Therefore, overhead that may be otherwise generated when all the channels are necessarily scanned can be reduced through the channel scanning method according to the exemplary embodiment of the present invention.

Figure 7:
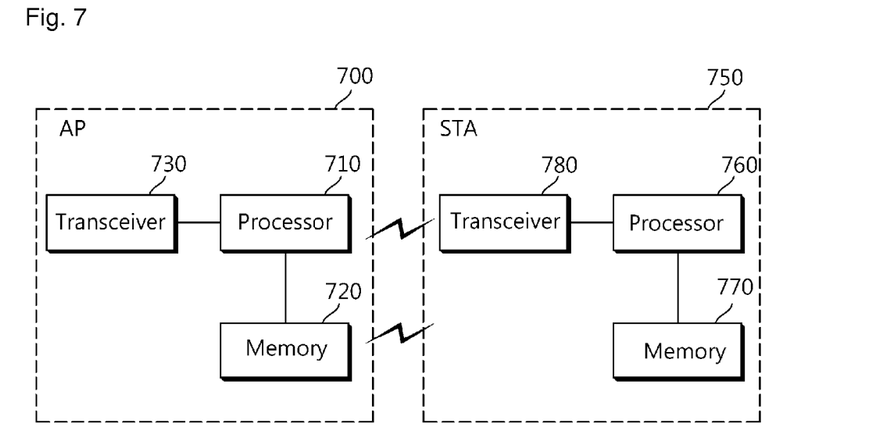
FIG. 7 is a schematic block diagram of wireless apparatuses implementing an exemplary embodiment of the present invention.

FIG. 7 is a schematic block diagram of wireless apparatuses implementing an exemplary embodiment of the present invention. An AP 700 includes a processor 710, a memory 720, a transceiver 730, and a STA 750 includes a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

The invention claimed is:

1. A method to support a station for scanning channels of a white space zone in a wireless local area network, performed by an access point, the method comprising:
    acquiring, by the access point from a geo-location database separate from the access point, information on available channels to operate in the white space zone;
    generating, based on the information acquired from the geo-location database, a white space map including information identifying at least one available channel in the white space zone; and
    transmitting, by the access point to the station, an unsolicited frame that is transmitted by the access point without being requested from the station, the unsolicited frame including the white space map to be used by the station for scanning for at least one existing basic service set on the at least one available channel identified within the white space map,
    wherein the station does not operate on a channel indicated as unavailable in the white space map and moves to a channel indicated as available in the white space map, and
    wherein the unsolicited frame is transmitted to the station before the scanning is performed by the station.

2. A method of scanning channels of a white space zone in a wireless local area network, performed by a scanning station, the method comprising:
    receiving, by the scanning station from an access point, an unsolicited frame that is transmitted by the access point without being requested from the scanning station, the unsolicited frame including a white space map including information identifying at least one available channel in the white space zone, the white space map being generated at the access point based on information on available channels to operate in the white space zone; and
    scanning, after the unsolicited frame is received, for at least one existing basic service set on the at least one available channel identified within the white space map,
    wherein the station does not operate on a channel indicated as unavailable in the white space map and moves to a channel indicated as available in the white space map.

3. A wireless apparatus for scanning channels of a white space zone in a wireless local area network, the wireless apparatus comprising:
    a transceiver; and
    a processor configured to:
        receive, using the transceiver from an access point, an unsolicited frame that is transmitted by the access point without being requested by the apparatus, the unsolicited frame including a white space map including information identifying at least one available channel in the white space zone, the white space map being generated at the access point based on information on available channels to operate in the white space zone, and
        scan, after the unsolicited frame is received, for at least one existing basic service set on the at least one available channel identified within the white space map,
    wherein the station does not operate on a channel indicated as unavailable in the white space map and moves to a channel indicated as available in the white space map.

4. A wireless apparatus to support a station for scanning channels of a white space zone in a wireless local area network, the wireless apparatus comprising:
    a transceiver; and
    a processor,
    wherein the processor is configured to:
        acquire, using the transceiver from a geo-location database separate from the access point, information on available channels to operate in the white space zone,
        generate, based on the information acquired from the geo-location database, a white space map including information identifying at least one available channel in the white space zone, and
        transmit, using the transceiver to the station, an unsolicited frame that is transmitted by the access point without being requested from the station, the unsolicited frame including the white space map to be used by the station for scanning for at least one existing basic service set on the at least one available channel identified within the white space map,
    wherein the station does not operate on a channel indicated as unavailable in the white space map and moves to a channel indicated as available in the white space map, and wherein the unsolicited frame is transmitted to the station before the scanning is performed by the station.

* * * * *